(12) United States Patent
Jiang (10) Patent No.: US 11,659,637 B2
(45) Date of Patent: May 23, 2023

(54) COLOR MATCHING METHOD, COLOR REGULATION METHOD, AND COLOR REGULATION SYSTEM FOR AUTOMATICALLY IMPLEMENTING MAXIMUM BRIGHTNESS OF COLORED LIGHT

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd.

( * ) Notice: Subject to any disclaimer, the term of this patent is extended or adjusted under 35 U.S.C. 154(b) by 288 days.

(21) Appl. No.: 17/038,484

(22) Filed: Sep. 30, 2020

(65) Prior Publication Data

US 2021/0014946 A1 Jan. 14, 2021

Related U.S. Application Data

(63) Continuation of application No. PCT/CN2019/115410, filed on Nov. 4, 2019.

(30) Foreign Application Priority Data

Nov. 2, 2018 (CN) .......................... 201811301693.2

(51) Int. Cl.
*H05B 45/20* (2020.01)
*H05B 45/30* (2020.01)
*H05B 47/10* (2020.01)

(52) U.S. Cl.
CPC ............. *H05B 45/20* (2020.01); *H05B 45/30* (2020.01); *H05B 47/10* (2020.01)

(58) Field of Classification Search
CPC ........ H05B 45/20; H05B 45/30; H05B 47/11; H05B 47/115; H05B 47/155; H05B 47/10; Y02B 20/40
See application file for complete search history.

(56) References Cited

U.S. PATENT DOCUMENTS 7,515,128 B2   4/2009   Dowling
2006/0226956 A1*  10/2006   Young .................... G09F 9/33
                                                      340/286.01

(Continued)

FOREIGN PATENT DOCUMENTS

CN    101568952 A    10/2009
CN    103295559 A     9/2013
(Continued)

OTHER PUBLICATIONS

International Search Report for PCT/CN2019/115410 dated Jan. 17, 2020; 2 pages.

(Continued)

*Primary Examiner* — Raymond R Chai
(74) *Attorney, Agent, or Firm* — Lerner David LLP (57) ABSTRACT

A color matching method, color regulation method, and color regulation system for automatically implementing the maximum brightness of a colored light, using a color matching algorithm for the maximum brightness so that a brightness formula for each primary color when the colored light implements a certain color coordinate point within the color gamut space can be efficiently and accurately calculated, and the brightness of the colored light reaches a maximum value after the color matching. The brightness formulae for commonly used target colors within the color gamut space of the colored light is calculated by means of the color matching algorithm for the maximum brightness, and these formulae are stored in a control unit of a light.

10 Claims, 2 Drawing Sheets

(56) References Cited

U.S. PATENT DOCUMENTS

2010/0060185 A1* 3/2010 Van Duijneveldt .. H04N 1/6086
　　　　　　　　　　　　　　　　　　　　313/504
2019/0162377 A1* 5/2019 Chen ..................... H05B 45/20

FOREIGN PATENT DOCUMENTS

| CN | 105101516 A | | 11/2015 | |
|----|----|----|----|----|
| CN | 105430790 A | | 3/2016 | |
| CN | 107101172 A | | 8/2017 | |
| CN | 109496035 A | | 3/2019 | |
| CN | 110677955 A | * | 1/2020 | |
| CN | 110719661 A | * | 1/2020 | |
| CN | 113129813 A | * | 7/2021 | ............... G09G 3/32 |
| CN | 114727452 A | * | 7/2022 | |
| WO | WO-2020238960 A1 | * | 12/2020 | ........... G09G 3/2003 |

OTHER PUBLICATIONS

Extended European Search Report for Application No. 19878219.5 dated Dec. 8, 2021. 10 pgs.

* cited by examiner

COLOR MATCHING METHOD, COLOR REGULATION METHOD, AND COLOR REGULATION SYSTEM FOR AUTOMATICALLY IMPLEMENTING MAXIMUM BRIGHTNESS OF COLORED LIGHT

CROSS REFERENCE TO RELATED APPLICATIONS

The present application is a continuation of International Application No. PCT/CN2019/115410, filed on Nov. 4, 2019, which claims priority from Chinese Patent Application No. 201811301693.2 filed on Nov. 2, 2018, all of which are hereby incorporated herein by reference.

TECHNICAL FIELD

The present invention relates to the technical field of illumination with a colored light, and in particular to a color matching method, color regulation method, and color regulation system for automatically implementing the maximum brightness of a colored light.

BACKGROUND ART

With the continuous development of science and technology and the increasingly colorful human living environment, people's demands for lighting and lighting colors are increasing. Like in daily life, work, entertainment, celebrations, performances, banquets, parties and other occasions, people need more diverse and colorful environments. In order to satisfy the diverse demands of people, colored lights and technologies thereof continuously develop. A common colored light is achieved by mixing three colors: red, green, and blue. The three primary colors RGB are mixed in different proportions and intensity to produce various colors. In addition, there are more colored lights with primary colors, such as RGBW.

When light regulation and color mixing are performed on a traditional colored light, light regulation personnel adjust the brightness ratio of RGBW by pushing four faders on a control console that correspond to RGBW channels, so as to obtain the desired colors through mixing. Disadvantages of such a color mixing method are apparent, which require the light regulation personnel to have rich experiences in color matching and keen color discrimination abilities. For example, when an effect of 3000 K color temperature needs to be achieved through mixing in a certain scene, the light regulation personnel need keen color discrimination abilities to discriminate the 3000 K color temperature, and further need experiences and trials to adjust the brightness ratio of RGBW. But when it is required to accurately obtain a color in a certain scene through mixing, such as the color with color coordinates (0.3804, 0.3767), it is difficult to achieve even if the light dimming personnel use an instrument to perform measurement while performing regulation. The method for implementing color mixing through manually adjustment of the brightness ratio of various primary colors is inefficient and inaccurate.

In addition, the color mixing effect obtained through matching performed by the light regulation personnel based on the experiences only satisfies the color effect, but the maximum brightness is not obtained, and the brightness resources of the colored light cannot be utilized to the utmost extent.

SUMMARY

In order to overcome at least one of the deficiencies (drawbacks) described above in the prior art, the present invention provides a color matching method, color regulation method, and color regulation system for automatically implementing the maximum brightness of a colored light, so that it can efficiently and accurately calculate the brightness formula of each primary color when the colored light implements a certain color coordinate point within a color gamut space and a brightness priority strategy is adopted to ensure that the brightness resources of the colored light is utilized to the utmost extent after the color mixing of the colored light.

The following technical solutions are used to achieve the objective of the present invention:

According to one aspect, a color matching method for automatically implementing the maximum brightness of a colored light is provided, which comprises:

collecting brightness values and color coordinate values of various primary colors of a colored light; and establishing a linear programming model according to a target color mixture $K_t$ and the brightness values and the color coordinate values of the various primary colors of the colored light, and taking a maximum value of a brightness sum value $L_{sum}$ of the various primary colors of the colored light as a target to solve the linear programming model, so as to obtain brightness formula values for the various primary colors that correspond to the maximum value of the brightness sum value $L_{sum}$.

Preferably, when the colored light has four primary colors, the color coordinates of the target color mixture $K_t$ of the colored light are denoted as $(x_t, y_t)$, the brightness values of the four primary colors of the colored light are respectively denoted as $L'_r$, $L'_g$, $L'_b$, and $L'_w$, and the color coordinates of the four primary colors of the colored light are respectively denoted as $(x_r, y_r)$, $(x_g, y_g)$, $(x_b, y_b)$, and $(x_w, y_w)$;

the linear programming model is the following formula:

a target function: max $L_{sum} = L'_r + L'_g + L'_b + L'_w$, $$\text{s.t.} \begin{cases} 0 \leq L'_r \leq L_r \\ 0 \leq L'_g \leq L_g \\ 0 \leq L'_b \leq L_b \\ 0 \leq L'_w \leq L_w \\ \frac{x_t}{y_t}(L'_r + L'_g + L'_b + L'_w) = \frac{x_r}{y_r}L'_r + \frac{x_g}{y_g}L'_g + \frac{x_b}{y_b}L'_b + \frac{x_w}{y_w}L'_w \\ \frac{1-x_t-y_t}{y_t}(L'_r + L'_g + L'_b + L'_w) = \frac{1-x_r-y_r}{y_r}L'_r + \\ \frac{1-x_g-y_g}{y_g}L'_g + \frac{1-x_b-y_b}{y_b}L'_b + \frac{1-x_w-y_w}{y_w}L'_w \end{cases}$$

where $L_r$, $L_g$, $L_b$, and $L_w$ are respectively the maximum brightness values of the four primary colors of the colored light; and when the colored light has three primary colors, the color coordinates of the target color mixture $K_t$ of the colored light are denoted as $(x_t, y_t)$, the brightness values of the four primary colors of the colored light are respectively denoted as $L'_r$, $L'_g$, and $L'_b$, and the color coordinates of the three primary colors of the colored light are respectively denoted as $(x_r, y_r)$, $(x_g, y_g)$, and $(x_b, y_b)$;

the linear programming model is the following formula:

a target function: max $L_{sum}=L'_r+L'_g+L'_b$, $$\text{s.t.}\begin{cases} 0 \le L'_r \le L_r \\ 0 \le L'_g \le L_g \\ 0 \le L'_b \le L_b \\ \frac{x_t}{y_t}(L'_r+L'_g+L'_b) = \frac{x_r}{y_r}L'_r + \frac{x_g}{y_g}L'_g + \frac{x_b}{y_b}L'_b \\ \frac{1-x_t-y_t}{y_t}(L'_r+L'_g+L'_b) = \frac{1-x_r-y_r}{y_r}L'_r + \\ \quad \frac{1-x_g-y_g}{y_g}L'_g + \frac{1-x_b-y_b}{y_b}L'_b \end{cases}$$

where $L_r$, $L_g$, and $L_b$ are respectively the maximum brightness values of the three primary colors of the colored light.

According to another aspect, a color regulation method for automatically implementing the maximum brightness of a colored light is further provided, which comprises:

a formula calculation step: calculating, according to a specified target color mixture $K_t$ and brightness values and color coordinate values of the various primary colors of a colored light, brightness formula values for the various primary colors that correspond to the maximum value of a brightness sum value $L_{sum}$ of the various primary colors of the colored light; and a color mixture control step: converting the brightness formula values for the various primary colors into a control signal, and controlling a color mixture of the colored light according to the control signal.

Preferably, the formula calculation step specifically comprises: respectively calculating, according to specified n target color mixtures $K_t$ and the brightness values and the color coordinate values of the various primary colors of the colored light, n groups of brightness formula values for the various primary colors that correspond to the maximum values of the brightness sum value $L_{sum}$ of the various primary colors of the colored light in the case of the n target color mixtures $K_t$, where n is a natural number; and the color mixture control step specifically comprises: pre-storing the n groups of brightness formula values for the various primary colors, selecting one of the pre-stored groups of brightness formula values for the various primary colors, converting the selected brightness formula values for the various primary colors into a control signal, and controlling the color mixture of the colored light according to the control signal.

Preferably, the formula calculation step of calculating, according to a specified target color mixture $K_t$ and brightness values and color coordinate values of the various primary colors of the colored light, brightness formula values for the various primary colors that correspond to the maximum value of a brightness sum value $L_{sum}$ of the various primary colors of the colored light specifically comprises:

establishing a linear programming model according to the specified target color mixture $K_t$ and the brightness values and the color coordinate values of the various primary colors of the colored light, and taking the maximum value of the brightness sum value $L_{sum}$ of the various primary colors of the colored light as a target to solve the linear programming model, so as to obtain the brightness formula values for the various primary colors that correspond to the maximum value of the brightness sum value $L_{sum}$;

when the colored light has four primary colors, the color coordinates of the target color mixture $K_t$ of the colored light are denoted as $(x_t, y_t)$, the brightness values of the four primary colors of the colored light are respectively denoted as $L'_r$, $L'_g$, $L'_b$, and $L'_w$, and the color coordinates of the four primary colors of the colored light are respectively denoted as $(x_r, y_r)$, $(x_g, y_g)$, $(x_b, y_b)$, and $(x_w, y_w)$;

the linear programming model is the following formula:

a target function: max $L_{sum}=L'_r+L'_g+L'_b+L'_w$, $$\text{s.t.}\begin{cases} 0 \le L'_r \le L_r \\ 0 \le L'_g \le L_g \\ 0 \le L'_b \le L_b \\ 0 \le L'_w \le L_w \\ \frac{x_t}{y_t}(L'_r+L'_g+L'_b+L'_w) = \frac{x_r}{y_r}L'_r + \frac{x_g}{y_g}L'_g + \frac{x_b}{y_b}L'_b + \frac{x_w}{y_w}L'_w \\ \frac{1-x_t-y_t}{y_t}(L'_r+L'_g+L'_b+L'_w) = \frac{1-x_r-y_r}{y_r}L'_r + \\ \quad \frac{1-x_g-y_g}{y_g}L'_g + \frac{1-x_b-y_b}{y_b}L'_b + \frac{1-x_w-y_w}{y_w}L'_w \end{cases}$$

where $L_r$, $L_g$, $L_b$, and $L_w$ are respectively the maximum brightness values of the four primary colors of the colored light; and when the colored light has three primary colors, the color coordinates of the target color mixture $K_t$ of the colored light are denoted as $(x_t, y_t)$, the brightness values of the three primary colors of the colored light are respectively denoted as $L'_r$, $L'_g$, and $L'_b$, and the color coordinates of the three primary colors of the colored light are respectively denoted as $(x_r, y_r)$, $(x_g, y_g)$, and $(x_b, y_b)$;

the linear programming model is the following formula:

a target function: max $L_{sum}=L'_r+L'_g+L'_b$, $$\text{s.t.}\begin{cases} 0 \le L'_r \le L_r \\ 0 \le L'_g \le L_g \\ 0 \le L'_b \le L_b \\ \frac{x_t}{y_t}(L'_r+L'_g+L'_b) = \frac{x_r}{y_r}L'_r + \frac{x_g}{y_g}L'_g + \frac{x_b}{y_b}L'_b \\ \frac{1-x_t-y_t}{y_t}(L'_r+L'_g+L'_b) = \frac{1-x_r-y_r}{y_r}L'_r + \\ \quad \frac{1-x_g-y_g}{y_g}L'_g + \frac{1-x_b-y_b}{y_b}L'_b \end{cases}$$

where $L_r$, $L_g$, and $L_b$ are respectively the maximum brightness values of the three primary colors of the colored light.

Preferably, the color mixture control step of converting the brightness formula values for the various primary colors into a control signal of a control console of the colored light specifically comprises:

dividing the brightness of the controlled colored light into N brightness levels from dark to bright, and converting the brightness formula values for the various primary colors into signal data of the control console of the colored light according to the following formula:

Signal data =

$$\frac{\text{Brightness formula values for various primary colors}}{\text{Maximum brightness values of the various primary colors}} \times N$$

converting the signal data into a control signal based on the brightness level M of the currently controlled colored light according to the following formula, where 0≤M≤N:

$$\text{Control signal} = \text{Signal data} \times \frac{M}{N}$$

According to still another aspect, a color regulation system for automatically implementing the maximum brightness of colored light is further provided, which comprises:

a color matching calculation unit configured to calculate, according to a specified target color mixture $K_t$ and brightness values and color coordinate values of various primary colors of a colored light, brightness formula values for the various primary colors that correspond to a maximum value of a brightness sum value $L_{sum}$ of the various primary colors of the colored light;

a signal conversion unit configured to convert the brightness formula values for the various primary colors into a control signal; and a drive unit configured to control the color mixture of the colored light according to the control signal.

Preferably, the color matching calculation unit is specifically configured to:

respectively calculate, according to specified n target color mixtures $K_t$ and the brightness values and the color coordinate values of the various primary colors of the colored light, n groups of brightness formula values for the various primary colors that correspond to the maximum values of the brightness sum value $L_{sum}$ of the various primary colors of the colored light in the case of the n target color mixtures $K_t$, where n is a natural number;

the system further comprises:

a color matching regulation channel configured to input a color index value i, where i=1, 2, ..., and n; and a control unit configured to pre-store the n groups of brightness formula values for the various primary colors, acquire the color index value i, and select the pre-stored $i^{th}$ group of brightness formula values for the various primary colors; and the signal conversion unit is specifically configured to:

convert the $i^{th}$ group of brightness formula values for the various primary colors into a control signal.

Preferably, the color matching calculation unit is specifically configured to:

establish a linear programming model according to the specified target color mixture $K_t$ and the brightness values and the color coordinate values of the various primary colors of the colored light, and take the maximum value of the brightness sum value $L_{sum}$ of the various primary colors of the colored light as a target to solve the linear programming model, so as to obtain the brightness formula values for the various primary colors that correspond to the maximum value of the brightness sum value $L_{sum}$;

when the colored light has four primary colors, the color coordinates of the target color mixture $K_t$ of the colored light are denoted as $(x_t, y_t)$, the brightness values of the four primary colors of the colored light are respectively denoted as $L'_r$, $L'_g$, $L'_b$, and $L'_w$, and the color coordinates of the four primary colors of the colored light are respectively denoted as $(x_r, y_r)$, $(x_g, y_g)$, $(x_b, y_b)$, and $(x_w, y_w)$;

the linear programming model is the following formula:

a target function: max $L_{sum} = L'_r + L'_g + L'_b + L'_w$, $$\text{s.t.} \begin{cases} 0 \leq L'_r \leq L_r \\ 0 \leq L'_g \leq L_g \\ 0 \leq L'_b \leq L_b \\ 0 \leq L'_w \leq L_w \\ \frac{x_t}{y_t}(L'_r + L'_g + L'_b + L'_w) = \frac{x_r}{y_r}L'_r + \frac{x_g}{y_g}L'_g + \frac{x_b}{y_b}L'_b + \frac{x_w}{y_w}L'_w \\ \frac{1-x_t-y_t}{y_t}(L'_r + L'_g + L'_b + L'_w) = \frac{1-x_r-y_r}{y_r}L'_r + \\ \frac{1-x_g-y_g}{y_g}L'_g + \frac{1-x_b-y_b}{y_b}L'_b + \frac{1-x_w-y_w}{y_w}L'_w \end{cases}$$

where $L_r$, $L_g$, $L_b$, and $L_w$ are respectively the maximum brightness values of the four primary colors of the colored light; and when the colored light has three primary colors, the color coordinates of the target color mixture $K_t$ of the colored light are denoted as $(x_t, y_t)$, the brightness values of the four primary colors of the colored light are respectively denoted as $L'_r$, $L'_g$, and $L'_b$, and the color coordinates of the three primary colors of the colored light are respectively denoted as $(x_r, y_r)$, $(x_g, y_g)$, and $(x_b, y_b)$;

the linear programming model is the following formula:

a target function: max $L_{sum} = L'_r + L'_g + L'_b$, $$\text{s.t.} \begin{cases} 0 \leq L'_r \leq L_r \\ 0 \leq L'_g \leq L_g \\ 0 \leq L'_b \leq L_b \\ \frac{x_t}{y_t}(L'_r + L'_g + L'_b) = \frac{x_r}{y_r}L'_r + \frac{x_g}{y_g}L'_g + \frac{x_b}{y_b}L'_b \\ \frac{1-x_t-y_t}{y_t}(L'_r + L'_g + L'_b) = \frac{1-x_r-y_r}{y_r}L'_r + \\ \frac{1-x_g-y_g}{y_g}L'_g + \frac{1-x_b-y_b}{y_b}L'_b \end{cases}$$

where $L_r$, $L_g$, and $L_b$ are respectively the maximum brightness values of the three primary colors of the colored light.

Preferably, the system further comprises:

a brightness regulation channel configured to input the brightness level M of the currently controlled colored light; and the signal conversion unit is specifically configured to:

divide the brightness of the controlled colored light into N levels from dark to bright, and convert the brightness formula values for the various primary colors into signal data of a control console of the colored light according to the following formula:

Signal data =

$$\frac{\text{Brightness formula values for various primary colors}}{\text{Maximum brightness values of the various primary colors}} \times N$$

convert the signal data into a control signal based on the brightness level M of the currently controlled colored light according to the following formula, where 0≤M≤N:

$$\text{Control signal} = \text{Signal data} \times \frac{M}{N}$$

Compared with the prior art, the technical solutions of the present invention have the beneficial effects as follows:

(1) in the present invention, a color matching algorithm for the maximum brightness is used so that it can efficiently and accurately calculate the brightness formula of each primary color when the colored light implements a certain color coordinate point within a color gamut space, and in addition, the brightness of the colored light reaches a maximum value after the color matching, thereby fully utilizing the brightness resources of the colored light;

(2) in the present invention, the color matching algorithm for the maximum brightness is used to obtain optimal color matching schemes corresponding to multiple different color coordinates through matching, and the optimal color matching schemes are per-stored, and during use, corresponding faders on a control console are pushed to show color index values, so that it is convenient to invoke the pre-stored and matched optimal color matching schemes, and light regulation personnel can perform color matching faster and more accurately;

(3) in the present invention, during use, the corresponding faders on the control console may be pushed to show the control brightness level of a brightness regulation channel, so that the matched color brightness can be changed, and the light regulation personnel can linearly change the color brightness after the color matching without changing the color coordinates, thereby satisfying the brightness demands of different scenes; and (4) in the present invention, a linear correction step is added so that when linear characteristics of a drive device and an LED light bead of the colored light are not good, the color brightness can also be linearly changed while the color coordinates remain unchanged.

DETAILED DESCRIPTION OF EMBODIMENTS

The accompanying drawings are merely for exemplary illustration and are not to be construed as limiting the present patent.

For better illustration of the embodiments, some components in the figures may be omitted, scaled up or scaled down, which does not represent the actual size of a product.

For those skilled in the art, it would have been appreciated that some well-known structures in the figures and the illustration thereof could be omitted.

In the description of the present invention, unless otherwise stated, "multiple" means two or more.

The technical solutions of the present invention are further described in conjunction with drawings and embodiments below.

Embodiment 1

This embodiment provides a color matching method for automatically implementing the maximum brightness of a colored light, which comprises the steps of:

obtaining brightness values and color coordinate values of various primary colors of a colored light; and establishing a linear programming model according to a target color mixture $K_t$, the brightness values and the color coordinate values of the various primary colors of the colored light, and taking a maximum value of a brightness sum value $L_{sum}$ of the various primary colors of the colored light as a target to solve the linear programming model, so as to obtain brightness formula values for the various primary colors that correspond to the maximum value of the brightness sum value $L_{sum}$.

When the colored light has four primary colors, the color coordinates of the target color mixture $K_t$ of the colored light are set to $(x_t, y_t)$, the brightness values of the four primary colors of the colored light are respectively denoted as $L'_r$, $L'_g$, $L'_b$, and $L'_w$, and the color coordinates of the four primary colors of the colored light are respectively denoted as $(x_r, y_r)$, $(x_g, y_g)$, $(x_b, y_b)$, and $(x_w, y_w)$;

the subscripts r, g, b, and w represent primary colors: red, green, blue, and white, and the subscript t represents a target color mixture; and the linear programming model is the following formula:

a target function: max $L_{sum} = L'_r + L'_g + L'_b + L'_w$, $$\text{s.t.} \begin{cases} 0 \le L'_r \le L_r \\ 0 \le L'_g \le L_g \\ 0 \le L'_b \le L_b \\ 0 \le L'_w \le L_w \\ \frac{x_t}{y_t}(L'_r + L'_g + L'_b + L'_w) = \frac{x_r}{y_r}L'_r + \frac{x_g}{y_g}L'_g + \frac{x_b}{y_b}L'_b + \frac{x_w}{y_w}L'_w \\ \frac{1 - x_t - y_t}{y_t}(L'_r + L'_g + L'_b + L'_w) = \frac{1 - x_r - y_r}{y_r}L'_r + \\ \frac{1 - x_g - y_g}{y_g}L'_g + \frac{1 - x_b - y_b}{y_b}L'_b + \frac{1 - x_w - y_w}{y_w}L'_w \end{cases}$$

where $L_r$, $L_g$, $L_b$, and $L_w$ are respectively the maximum brightness values of the four primary colors of the colored light, and s.t. represents a constraint condition.

When the colored light has three primary colors, the color coordinates of the target color mixture $K_t$ of the colored light are set to $(x_t, y_t)$, the brightness values of the four primary colors of the colored light are respectively denoted as $L'_r$, $L'_g$, and $L'_b$, and the color coordinates of the three primary colors of the colored light are respectively denoted as $(x_r, y_r)$, $(x_g, y_g)$, and $(x_b, y_b)$;

the subscripts r, g, and b represent primary colors: red, green, and blue, and the subscript t represents a target color mixture; and the linear programming model is the following formula:

a target function: max $L_{sum} = L'_r + L'_g + L'_b$, $$\text{s.t.} \begin{cases} 0 \le L'_r \le L_r \\ 0 \le L'_g \le L_g \\ 0 \le L'_b \le L_b \\ \frac{x_t}{y_t}(L'_r + L'_g + L'_b) = \frac{x_r}{y_r}L'_r + \frac{x_g}{y_g}L'_g + \frac{x_b}{y_b}L'_b \\ \frac{1 - x_t - y_t}{y_t}(L'_r + L'_g + L'_b) = \frac{1 - x_r - y_r}{y_r}L'_r + \\ \frac{1 - x_g - y_g}{y_g}L'_g + \frac{1 - x_b - y_b}{y_b}L'_b \end{cases}$$

where $L_r$, $L_g$, and $L_b$ are respectively the maximum brightness values of the three primary colors of the colored light, and s.t. represents a constraint condition.

Taking the colored light having four primary colors as an example, the derivation process of the linear programming model is as follows:

Brightness parameters and chromaticity parameters of the various primary colors of the colored light are collected, and if the colored light has four primary colors, the maximum brightness values of the various primary colors are respectively denoted as $L_r$, $L_g$, $L_b$, and $L_w$, and the color coordinates of the various primary colors are respectively denoted as $(x_r, y_r)$, $(x_g, y_g)$, $(x_b, y_b)$, and $(x_w, y_w)$. The brightness value formulae for the various primary colors are supposed to be unknown numbers $L'_r$, $L'_g$, $L'_b$, and $L'_w$, and may enable the color coordinates of the color mixture to be equal to the color coordinates $(x_t, y_t)$ of the target color mixture $K_t$, and enable the brightness of the color mixture to reach a maximum value.

A relation between the color coordinates x, y, and z according to a CIE XYZ 1931 chromaticity system and three stimulus values X, Y, and Z is as follows:

$$x = \frac{X}{X+Y+Z}; y = \frac{Y}{X+Y+Z}; z = \frac{Z}{X+Y+Z} \qquad (1)$$

x is divided by y and z is divided y in Formula (1) to derive:

$$\frac{x}{Y} = \frac{X}{Y}; \frac{z}{Y} = \frac{Z}{Y} \qquad (2)$$

The relation between the color coordinates x, y, and z according to the CIE XYZ 1931 chromaticity system is x+y+z=1, the brightness L of a light source is equal to the value of Y among the three stimulus values X, Y, and Z of the light source (L=Y), and then the following formula may be derived in conjunction with Formula (2):

$$X = \frac{x}{y}L; Y = L; Z = \frac{1-x-y}{y}L \qquad (3)$$

It may be seen that Formula (3) is a conversion relation between the three stimulus values X, Y, and Z and the color coordinates x, y, and z. In the case of red, the following is derived from Formula (3):

$$\begin{cases} X_r = \frac{x_r}{y_r}L'_r \\ Y_r = L'_r \\ Z_r = \frac{1-x_r-y_r}{y_r}L'_r \end{cases} \qquad (4)$$

Similarly, in the case of green, the following is derived from Formula (3):

$$\begin{cases} X_g = \frac{x_g}{y_g}L'_g \\ Y_g = L'_g \\ Z_g = \frac{1-x_g-y_g}{y_g}L'_g \end{cases} \qquad (5)$$

Similarly, in the case of blue, the following is derived from Formula (3):

$$\begin{cases} X_b = \frac{x_b}{y_b}L'_b \\ Y_b = L'_b \\ Z_b = \frac{1-x_b-y_b}{y_b}L'_b \end{cases} \qquad (6)$$

Similarly, in the case of white, the following is derived from Formula (3):

$$\begin{cases} X_w = \frac{x_w}{y_w}L'_w \\ Y_w = L'_w \\ Z_w = \frac{1-x_w-y_w}{y_w}L'_w \end{cases} \qquad (7)$$

Similarly, in the case of the target color mixture $K_t$, the following is derived based on Formula (3) and additivity of brightness:

$$\begin{cases} X_t = \frac{x_t}{y_t}(L'_r + L'_g + L'_b + L'_w) \\ Y_t = L'_r + L'_g + L'_b + L'_w \\ Z_t = \frac{1-x_t-y_t}{y_t}(L'_r + L'_g + L'_b + L'_w) \end{cases} \qquad (8)$$

In the case of the target color mixture $K_t$, the following formula may be further derived through superposition calculation of the three stimulus values X, Y, and Z of the various primary colors:

$$\begin{cases} X_t = X_r + X_g + X_b + X_w \\ Y_t = Y_r + Y_g + Y_b + Y_w \\ Z_t = Z_r + Z_g + Z_b + Z_w \end{cases} \qquad (9)$$

Formula (10) may be derived by substituting Formulas (4) to (8) into Formula (9):

$$\begin{cases} \frac{x_t}{y_t}(L'_r + L'_g + L'_b + L'_w) = \frac{x_r}{y_r}L'_r + \frac{x_g}{y_g}L'_g + \frac{x_b}{y_b}L'_b + \frac{x_w}{y_w}L'_w \\ L'_r + L_g + L'_b + L'_w = L'_r + L'_g + L'_b + L'_w \\ \frac{1-x_t-y_t}{y_t}(L'_r + L'_g + L'_b + L'_w) = \frac{1-x_r-y_r}{y_r}L'_r + \frac{1-x_g-y_g}{y_g}L'_g + \frac{1-x_b-y_b}{y_b}L'_b + \frac{1-x_w-y_w}{y_w}L'_w \end{cases} \qquad (10)$$

In this case, the following linear programming model is used to solve the unknown numbers, namely, the brightness values $L'_r$, $L'_g$, $L'_b$, and $L'_w$ of the various primary colors in Formula (10), the decision variables of the linear programming model are the unknown numbers, namely, the brightness values $L'_r$, $L'_g$, $L'_b$, and $L'_w$, the target function is maximizing the brightness sum value $L_{sum} = L'_r + L'_g + L'_b + L'_w$, and the constraint condition is satisfying that the brightness formula value does not exceed the inherent maximum brightness value of each primary color of the colored light, and the color coordinates after the color mixing are $(x_t, y_t)$, that is, satisfying a colorimetry equation constraint, in other words, Expression (11) of the linear programming model can be derived:

a target function: max $L_{sum}=L'_r+L'_g+L'_b+L'_w$, $$\text{s.t.} \begin{cases} 0 \le L'_r \le L_r \\ 0 \le L'_g \le L_g \\ 0 \le L'_b \le L_b \\ 0 \le L'_w \le L_w \\ \frac{x_t}{y_t}(L'_r+L'_g+L'_b+L'_w) = \frac{x_r}{y_r}L'_r + \frac{x_g}{y_g}L'_g + \frac{x_b}{y_b}L'_b + \frac{x_w}{y_w}L'_w \\ \frac{1-x_t-y_t}{y_t}(L'_r+L'_g+L'_b+L'_w) = \frac{1-x_r-y_r}{y_r}L'_r + \\ \frac{1-x_g-y_g}{y_g}L'_g + \frac{1-x_b-y_b}{y_b}L'_b + \frac{1-x_w-y_w}{y_w}L'_w \end{cases} \quad (11)$$

According to the derivation principle of the above linear programming model, the method may be further applied to colored lights having other numbers of primary colors, for example, a colored light having three primary colors.

By solving the linear programming model, the brightness formula for each primary color at this time can be sought from the known given color coordinates $(x_t, y_t)$ of the target color mixture $K_t$, so that the color coordinates of the color mixture with this formula are equal to the target color coordinates $(x_t, y_t)$, and the brightness of the color mixture reaches a maximum value. Therefore, in the method, a color matching algorithm for the maximum brightness is utilized so that a brightness formula for each primary color when a colored light implements a certain color coordinate point within a color gamut space can be efficiently and accurately calculated, and the brightness of the colored light reaches a maximum value after the color matching, thereby fully utilizing the brightness resources of the colored light.

Embodiment 2

This embodiment provides a color regulation method for automatically implementing the maximum brightness of a colored light, which comprises:

a formula calculation step:

calculating, according to a specified target color mixture $K_t$, and brightness values and color coordinate values of the various primary colors of the colored light, brightness formula values for the various primary colors that correspond to a maximum value of a brightness sum value $L_{sum}$ of the various primary colors of the colored light; and a color mixture control step:

converting the brightness formula values for the various primary colors into a control signal, and controlling a color mixture of the colored light according to the control signal.

In this embodiment, the formula calculation step specifically comprises:

respectively calculating, according to specified n target color mixtures $K_t$ and the brightness values and the color coordinate values of the various primary colors of the colored light, n groups of brightness formula values for the various primary colors that correspond to the maximum values of the brightness sum value $L_{sum}$ of the various primary colors of the colored light in the case of the n target color mixtures $K_t$, where n is a natural number; and the color mixture control step specifically comprises:

pre-storing the n groups of brightness formula values for the various primary colors, selecting one of the pre-stored groups of brightness formula values for the various primary colors, converting the selected brightness formula values for the various primary colors into a control signal, and controlling the color mixture of the colored light according to the control signal.

Different values within a color gamut space of the colored light are used for the target color mixtures $K_t$ of the colored light, and the formula calculation step is repeatedly used, so as to obtain optimal brightness formulae corresponding to different target color mixtures $K_t$, and these different brightness formulae may be pre-stored, so that it is convenient to invoke the pre-stored and matched optimal color matching schemes from the pre-stored brightness formulae, then the invoked brightness formulae are converted into a control signal of a control console of the colored light, and light regulation personnel regulate the color mixture of the colored light faster and more accurately.

In this embodiment, the formula calculation step of calculating, according to a specified target color mixture $K_t$ and brightness values and color coordinate values of various primary colors of a colored light, brightness formula values for the various primary colors that correspond to a maximum value of a brightness sum value $L_{sum}$ of the various primary colors of the colored light specifically comprises:

establishing a linear programming model according to the specified target color mixture $K_t$ and the brightness values and the color coordinate values of the various primary colors of the colored light, and taking the maximum value of the brightness sum value $L_{sum}$ of the various primary colors of the colored light as a target to solve the linear programming model, so as to obtain the brightness formula values for the various primary colors that correspond to the maximum value of the brightness sum value $L_{sum}$;

when the colored light has four primary colors, the color coordinates of the target color mixture $K_t$ of the colored light are denoted as $(x_t, y_t)$, the brightness values of the four primary colors of the colored light are respectively denoted as $L'_r$, $L'_g$, $L'_b$, and $L'_w$, and the color coordinates of the four primary colors of the colored light are respectively denoted as $(x_r, y_r)$, $(x_g, y_g)$, $(x_b, y_b)$, and $(x_w, y_w)$;

the linear programming model is the following formula:

a target function: max $L_{sum}=L'_r+L'_g+L'_b+L'_w$, $$\text{s.t.} \begin{cases} 0 \le L'_r \le L_r \\ 0 \le L'_g \le L_g \\ 0 \le L'_b \le L_b \\ 0 \le L'_w \le L_w \\ \frac{x_t}{y_t}(L'_r+L'_g+L'_b+L'_w) = \frac{x_r}{y_r}L'_r + \frac{x_g}{y_g}L'_g + \frac{x_b}{y_b}L'_b + \frac{x_w}{y_w}L'_w \\ \frac{1-x_t-y_t}{y_t}(L'_r+L'_g+L'_b+L'_w) = \frac{1-x_r-y_r}{y_r}L'_r + \\ \frac{1-x_g-y_g}{y_g}L'_g + \frac{1-x_b-y_b}{y_b}L'_b + \frac{1-x_w-y_w}{y_w}L'_w \end{cases}$$

where $L_r$, $L_g$, $L_b$, and $L_w$ are respectively the brightness values of the four primary colors of the colored light; and when the colored light has three primary colors, the color coordinates of the target color mixture $K_t$ of the colored light are denoted as $(x_t, y_t)$, the brightness values of the three primary colors of the colored light are respectively denoted as $L'_r$, $L'_g$, and $L'_b$, and the color coordinates of the three primary colors of the colored light are respectively denoted as $(x_r, y_r)$, $(x_g, y_g)$, and $(x_b, y_b)$;

the linear programming model is the following formula:

a target function: max $L_{sum} = L'_r + L'_g + L'_b$, $$\text{s.t.} \begin{cases} 0 \leq L'_r \leq L_r \\ 0 \leq L'_g \leq L_g \\ 0 \leq L'_b \leq L_b \\ \frac{x_t}{y_t}(L'_r + L'_g + L'_b) = \frac{x_r}{y_r}L'_r + \frac{x_g}{y_g}L'_g + \frac{x_b}{y_b}L'_b \\ \frac{1-x_t-y_t}{y_t}(L'_r + L'_g + L'_b) = \frac{1-x_r-y_r}{y_r}L'_r + \frac{1-x_g-y_g}{y_g}L'_g + \\ \frac{1-x_b-y_b}{y_b}L'_b \end{cases}$$

where $L_r$, $L_g$, and $L_b$ are respectively the maximum brightness values of the three primary colors of the colored light.

In this embodiment, the color mixture control step of converting the brightness formula values for the various primary colors into a control signal of a control console of the colored light specifically comprises:

dividing the brightness of the controlled colored light into N brightness levels from dark to bright, and converting the brightness formula values for the various primary colors into signal data of the control console of the colored light according to the following formula:

Signal data =

$$\frac{\text{Brightness formula values for various primary colors}}{\text{Maximum brightness values of the various primary colors}} \times N$$

converting the signal data into a control signal based on the brightness level M of the currently controlled colored light according to the following formula: $0 \leq M \leq N$ $$\text{Control signal} = \text{Signal data} \times \frac{M}{N}$$

Taking the colored light having four primary colors as an example, the brightness formulae $L'_r$, $L'_g$, $L'_b$, and $L'_w$ for the various primary colors are converted into signal data $R_t$, $G_t$, $B_t$, and $W_t$ of the control console of the colored light according to Formula (12):

$$R_t = \frac{L'_r}{L_r}N; \; G_t = \frac{L'_g}{L_g}N; \; B_t = \frac{L'_b}{L_b}N; \; W_t = \frac{L'_w}{L_w}N \tag{12}$$

The signal data $R_t$, $G_t$, $B_t$, and $W_t$ is converted into a control signal bright based on the brightness level M of the currently controlled colored light according to Formula (13), where $0 \leq M \leq N$:

$$\text{bright} = (R_t, G_t, B_t, W_t)\frac{M}{N} \tag{13}$$

The brightness formulae $L'_r$, $L'_g$, $L'_b$, and $L'_w$ for the various primary colors that are solved from the linear programming model may be substituted into Formula (12), and then the signal data $R_t$, $G_t$, $B_t$, and $W_t$ that can be invoked by the control console of the colored light can be obtained through conversion.

To further control the brightness of the color, based on the brightness level M of the currently controlled colored light, the signal data $R_t$, $G_t$, $B_t$, and $W_t$ is substituted into Formula (13), and the brightness of the color is linearly changed through the control signal bright while the color coordinates thereof remain unchanged.

In a specific implementation process, the brightness of the colored light may be controlled, by means of DMX values of a brightness regulation channel of the control console of the colored light, to make 255-level linear changes, that is, the brightness of the colored light is divided into 255 levels from dark to bright, where M is a DMX value of the brightness regulation channel, and M may fall within 0 to 255. In this case, the signal data $R_t$, $G_t$, $B_t$, and $W_t$ can be converted into the control signal bright according to Formula (14):

$$\text{bright} = (R_t, G_t, B_t, W_t)\frac{M}{255}, \; (M \text{ is an integer in } [0,255]) \tag{14}$$

In this embodiment, a linear correction step is further comprised. The linear correction step is added so that when linear characteristics of a drive device and an LED light bead of the colored light are not good, the color brightness can also be linearly changed while the color coordinates remain unchanged.

Embodiment 3

Figure 1:
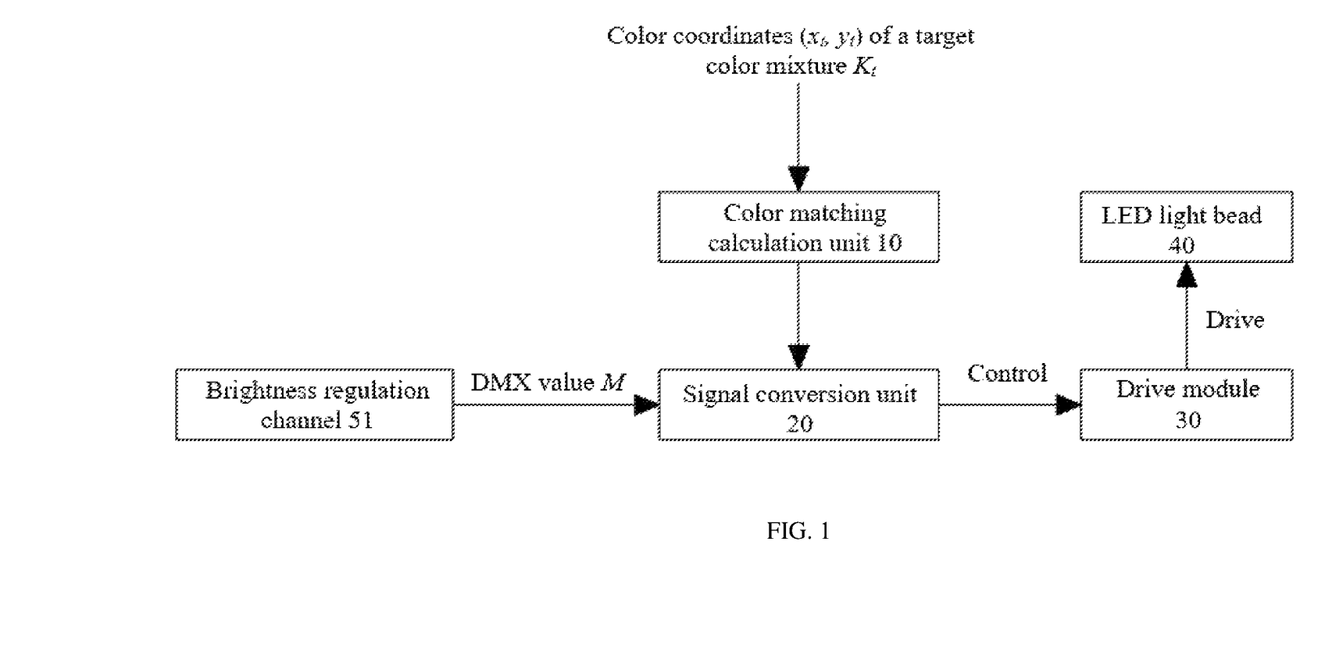
FIG. 1 is a principle diagram of a system composition according to Embodiment 3 of the present invention.

As shown in FIG. 1, this embodiment provides a color regulation system for automatically implementing the maximum brightness of a colored light, which comprises:

a color matching calculation unit 10 configured to calculate and obtain, according to a specified target color mixture $K_t$ and brightness values and color coordinate values of various primary colors of a colored light, brightness formula values for the various primary colors that correspond to a maximum value of a brightness sum value $L_{sum}$ of the various primary colors of the colored light;

a signal conversion unit 20 configured to convert the brightness formula values for the various primary colors into a control signal; and a drive unit 30 configured to control the color mixture of the colored light according to the control signal.

In a specific implementation process, the drive unit 30 is specifically configured to control the LED light bead 40 of the colored light according to the control signal.

In this embodiment, the system further comprises:

a brightness regulation channel 51 configured to input the brightness level M of the currently controlled colored light; and the signal conversion unit 20 is specifically configured to:

divide the brightness of the controlled colored light into N levels from dark to bright, and convert the brightness formula values for the various primary colors into signal data of a control console of the colored light according to the following formula:

Signal data =

$$\frac{\text{Brightness formula values for various primary colors}}{\text{Maximum brightness values of the various primary colors}} \times N$$

convert the signal data into a control signal based on the brightness level M of the currently controlled colored light according to the following formula, where $0 \leq M \leq N$:

$$\text{Control signal} = \text{Signal data} \times \frac{M}{N}$$

In a specific implementation process, the brightness of the colored light may be controlled, by means of DMX values of the brightness regulation channel 51 of the control console of the colored light, to make 255-level linear changes, that is, the brightness of the colored light is divided into 255 levels from dark to bright, where M is a DMX value of the brightness regulation channel 51, and M may fall within 0 to 255.

Figure 2:
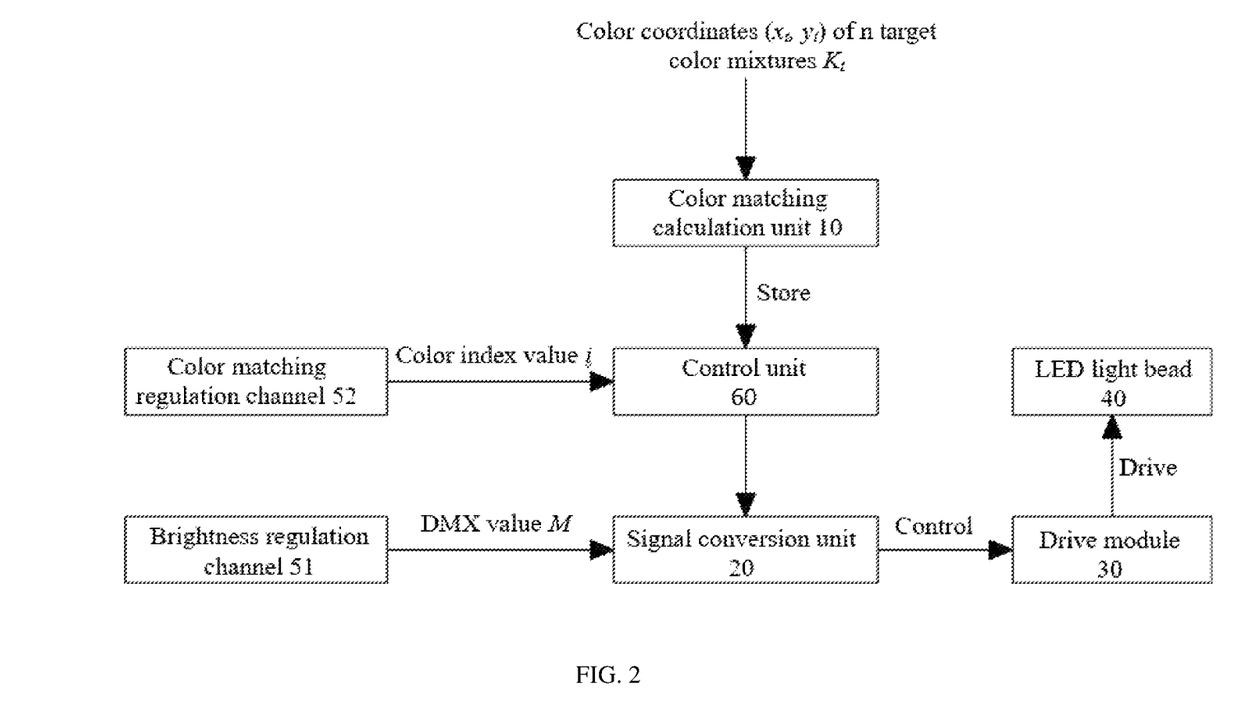
FIG. 2 is another principle diagram of the system composition according to Embodiment 3 of the present invention.

As shown in FIG. 2, in this embodiment, the color matching calculation unit 10 is specifically configured to:

respectively calculate, according to specified n target color mixtures $K_t$ and the brightness values and the color coordinate values of the various primary colors of the colored light, n groups of brightness formula values for the various primary colors that correspond to the maximum values of the brightness sum value $L_{sum}$ of the various primary colors of the colored light in the case of the n target color mixtures $K_t$, where n is a natural number;

the system further comprises:

a color matching regulation channel 52 configured to input a color index value i, where i=1, 2, ... , and n; and a control unit 60 configured to pre-store the n groups of brightness formula values for the various primary colors, acquire the color index value i, and select the pre-stored $i^{th}$ group of brightness formula values for the various primary colors; and the signal conversion unit 20 is specifically configured to:

convert the $i^{th}$ group of brightness formula values for the various primary colors into a control signal.

In this embodiment, the color matching calculation unit 10 is specifically configured to:

establish a linear programming model according to the specified target color mixture $K_t$ and the brightness values and the color coordinate values of the various primary colors of the colored light, and take the maximum value of the brightness sum value $L_{sum}$ of the various primary colors of the colored light as a target to solve the linear programming model, so as to obtain the brightness formula values for the various primary colors that correspond to the maximum value of the brightness sum value $L_{sum}$;

when the colored light has four primary colors, the color coordinates of the target color mixture $K_t$ of the colored light are denoted as $(x_t, y_t)$, the brightness values of the four primary colors of the colored light are respectively denoted as $L'_r$, $L'_g$, $L'_b$, and $L'_w$, and the color coordinates of the four primary colors of the colored light are respectively denoted as $(x_r, y_r)$, $(x_g, y_g)$, $(x_b, y_b)$, and $(x_w, y_w)$;

the linear programming model is the following formula:

a target function: $\max L_{sum} = L'_r + L'_g + L'_b + L'_w$, $$\text{s.t.} \begin{cases} 0 \leq L'_r \leq L_r \\ 0 \leq L'_g \leq L_g \\ 0 \leq L'_b \leq L_b \\ 0 \leq L'_w \leq L_w \\ \frac{x_t}{y_t}(L'_r + L'_g + L'_b + L'_w) = \frac{x_r}{y_r}L'_r + \frac{x_g}{y_g}L'_g + \frac{x_b}{y_b}L'_b + \frac{x_w}{y_w}L'_w \\ \frac{1-x_t-y_t}{y_t}(L'_r + L'_g + L'_b + L'_w) = \frac{1-x_r-y_r}{y_r}L'_r + \frac{1-x_g-y_g}{y_g}L'_g + \\ \frac{1-x_b-y_b}{y_b}L'_b + \frac{1-x_w-y_w}{y_w}L'_w \end{cases}$$

where $L_r$, $L_g$, $L_b$, and $L_w$ are respectively the maximum brightness values of the four primary colors of the colored light; and when the colored light has three primary colors, the color coordinates of the target color mixture $K_t$ of the colored light are denoted as $(x_t, y_t)$, the brightness values of the four primary colors of the colored light are respectively denoted as $L'_r$, $L'_g$, and $L'_b$, and the color coordinates of the three primary colors of the colored light are respectively denoted as $(x_r, y_r)$, $(x_g, y_g)$, and $(x_b, y_b)$;

the linear programming model is the following formula:

a target function: $\max L_{sum} = L'_r + L'_g + L'_b$, $$\text{s.t.} \begin{cases} 0 \leq L'_r \leq L_r \\ 0 \leq L'_g \leq L_g \\ 0 \leq L'_b \leq L_b \\ \frac{x_t}{y_t}(L'_r + L'_g + L'_b) = \frac{x_r}{y_r}L'_r + \frac{x_g}{y_g}L'_g + \frac{x_b}{y_b}L'_b \\ \frac{1-x_t-y_t}{y_t}(L'_r + L'_g + L'_b) = \frac{1-x_r-y_r}{y_r}L'_r + \frac{1-x_g-y_g}{y_g}L'_g + \\ \frac{1-x_b-y_b}{y_b}L'_b \end{cases}$$

where $L_r$, $L_g$, and $L_b$ are respectively the maximum brightness values of the three primary colors of the colored light.

In a specific implementation process, the control unit 60 may alternatively be specifically configured to convert n groups of brightness formula values for the various primary colors into n groups of signal data, pre-store the n groups of signal data, acquires the color index value i, and select the pre-stored $i^{th}$ group of signal data; and the signal conversion unit 20 may alternatively be specifically configured to convert the $i^{th}$ group of signal data into a control signal.

The formula calculation step as described above is used multiple times, the brightness value formulae for commonly target colors (for example, multiple target color coordinates on a blackbody locus line) within a color gamut space of the colored light are calculated, and these brightness value formulae are stored in the control unit 60 of the colored light. As such, light regulation personnel can conveniently invoke a desired color mixing formula by regulating a DMX value of the color matching regulation channel 52 on the control console of the colored light, thereby automatically achieving one-key fast and accurate color mixing. In addition, the maximum brightness may be achieved after the color mixing, so that the brightness resources of the light can be utilized to the utmost extent. In the application after the color mixing, the light regulation personnel can also regulate the DMX values of the brightness regulation channel 51 on the control console of the colored light to enable the overall brightness of the color mixture to make 255-level linear changes, and the configured target color coordinates are not caused to change during the light regulation process so as to satisfy the demands of automatic, quick, and accurate color matching and light regulation for different chromaticities and different brightness in more scenes.

Taking a colored light having four primary colors as an example, a color regulation process for automatically implementing the maximum brightness by the colored light is specifically as follows: Brightness parameters and chromaticity parameters of the colored light are collected, and the maximum brightness values of the various primary colors of the colored light are respectively $L_r=1160$, $L_g=2320$, $L_b=386$, and $L_w=2350$, and the color coordinates of the various primary colors of the colored light are respectively $(x_r, y_r)=(0.702, 0.297)$, $(x_g, y_g)=(0.156, 0.717)$, $(x_b, y_b)=(0.138, 0.045)$, and $(x_w, y_w)=(0.398, 0.386)$. The color temperature of the target color mixture $K_t$ is required to be 4545 K, and the color temperature falls on a point on the blackbody locus line. It is known that the target color coordinates of this point are $(x_t, y_t)=(0.3591, 0.3624)$, and the color mixture obtained through matching is required to satisfy the brightness reaching a maximum value in addition to satisfying the target color coordinates.

The above known data is substituted into Formula (11), and Formula (15) is derived after simplification:

a target function: max $L_{sum}=L'_r+L'_g+L'_b+L'_w$, $$\text{s.t.}\begin{cases} 0 \le L'_r \le 1160 \\ 0 \le L'_g \le 2320 \\ 0 \le L'_b \le 386 \\ 0 \le L'_w \le 2350 \\ 0.990894040\left(L'_r + L'_g + L'_b + L'_w\right) = 2.363636364\,L'_r + \\ \quad 0.217573222\,L'_g + 3.066666667\,L'_b + 1.031088083\,L'_w \\ 0.768487859\left(L'_r + L'_g + L'_b + L'_w\right) = 0.003367003\,L'_r + \\ \quad 0.177126918\,L'_g + 18.15555556\,L'_b + 0.559585492\,L'_w \end{cases} \quad (15)$$

The brightness value formulae for the various primary colors are obtained by solving Formula (15):

$L'_r=1008.988$, $L'_g=2320$, $L'_b=151.5423$, $L'_w=2350$

In this case, the brightness sum value reaches the maximum value $L_{sum}=L'_r+L'_g+L'_b+L'_w=5830.531$.

The calculated brightness value formulae for the various primary colors are converted into signal data $R_t$, $G_t$, $B_t$, and $W_t$ of the control console of the colored light, and when it is assumed that the control console of the colored light controls the brightness of the colored light, and the brightness being divided into N levels from the darkest to the brightest, where N=255, the signal data corresponding to the brightness value formulae for the various primary colors are converted as follows from Formula (16):

$$R_t = \frac{L'_r}{L_r}N = \frac{1008.988}{221.8035} \times 255 = 221.8035 \approx 222;$$

$$G_t = \frac{L'_g}{L_g}N = \frac{2320}{2320} \times 255 = 255;$$

$$B_t = \frac{L'_b}{L_b}N\frac{151.5423}{386} \times 255 = 100.1121 \approx 100;$$

$$W_t = \frac{L'_w}{L_w}N = \frac{2350}{2350} \times 255 = 255;$$

(16)

It may be known from Formula (16) that the values of ($R_t$, $G_t$, $B_t$, and $W_t$) in the signal data are (222, 255, 100, 255).

After the colored light implements the target color mixture, the brightness of the color may be further controlled by means of the brightness regulation channel 51, the maximum brightness sum value $L_{sum}=5830.531$ is divided into 256 parts (the DMX values of the brightness regulation channel 51 on the control console of the colored light are integers within 0 to 255), the signal data (222, 255, 100, 255) is regulated at levels of 0 to 255, and the expression (17) of the control signal bright is derived from Formula (13):

$$\text{bright} = (222, 255, 100, 255)\frac{M}{255}, (M \text{ is an integer in } [0,255]) \quad (17)$$

The signal data (222, 255, 100, 255) is regulated at levels of 0 to 255 on the brightness regulation channel 51 of the control console of the colored light, and the color brightness can be linearly changed while the color coordinates of the color mixture remain unchanged.

The obtained control signal bright may be directly used to control the color mixture of the colored light.

Alternatively, the signal data (222, 255, 100, 255) is first stored in a control unit chip of the light, and the storage position of the signal data (222, 255, 100, 255) is set to 1, then when the color matching regulation channel of the control console inputs the color index value 1, it indicates that the colored light needs to achieve the target color mixture at the storage position 1. In this case, the signal data (222, 255, 100, 255) is invoked and converted into the control signal bright to control the color mixture of the colored light.

Alternatively, the brightness formula values for the various primary colors may be first stored in the control unit chip of the light, and the storage position of the brightness formula values is set to 1, then when the color matching regulation channel 52 of the control console inputs the color index value 1, it indicates that the colored light needs to achieve the target color mixture at the storage position 1. In this case, the brightness formula values are invoked and converted into signal data, and the signal data is converted into a control signal to control the color mixture of the colored light.

Finally, the color mixture of the colored light is expressed as target color coordinates $(x_t, y_t)=(0.3591, 0.3624)$, and the maximum brightness sum value $L_{sum}=5830.531$.

The coordinates of different points in the color gamut spaces of n colored lights are used for the color coordinates of the target color mixture $K_t$, and the above process are repeated, so that the corresponding n groups of signal data $R_t$, $G_t$, $B_t$, and $W_t$ can be obtained. During application, when the color matching regulation channel 52 of the control console of the colored light inputs a DMX value, namely, a color index value i, where i=1, 2, . . . , and n, the $i^{th}$ group of signal data $R_{ti}$, $G_{ti}$, $B_{ti}$, and $W_{ti}$ can be invoked to control the color mixture of colored light.

The same or similar reference numerals correspond to the same or similar components.

The position relationship described in the drawings are merely for exemplary illustration and are not to be construed as limiting the present patent.

Obviously, the above embodiments of the present invention are merely examples used for clearly describing the present invention, instead of limiting the implementations of the present invention. For those of ordinary skill in the art, other different forms of changes or variations could have also been made on the basis of the above-mentioned illustration. There is no need and no way to exhaustively list all implementations here. Within the spirit and principle of the present invention, any modifications, equivalent replacements, improvements, etc., shall be comprised within the scope of protection of the claims of the present invention.

The invention claimed is:

1. A color matching method for automatically implementing the maximum brightness of a colored light, comprising:
   collecting brightness values and color coordinate values of each primary color of the colored light;
   establishing a linear programming model according to a target color mixture $K_t$, and the brightness values and the color coordinate values of each primary color of the colored light; and
   taking a maximum value of a brightness sum value $L_{sum}$ of the primary colors of the colored light as a target function to solve the linear programming model to obtain brightness values for each primary color under the maximum value of the brightness sum value $L_{sum}$, the obtained brightness values for each primary color refer to as brightness formula values for each primary color, the brightness sum value $L_{sum}$ is a sum of the brightness values of each primary color, wherein when the colored light has m primary colors, the color coordinate values of the target color mixture $K_t$ of the colored light are denoted as $(x_t, y_t)$, the brightness values of the m primary colors of the colored light are respectively denoted as $L'_1, L'_2, \ldots, L'_m$, and the color coordinate values of the m primary colors of the colored light are respectively denoted as $(x_1, y_1), (x_2, y_2), \ldots,$ and $(x_m, y_m)$;

the linear programming model is the following formula:

a target function: max $L_{sum}=L'_1+L'_2+L'_m$, $$s.t. \begin{cases} 0 \le L'_1 \le L_1 \\ 0 \le L'_1 \le L_2 \\ \ldots \ldots \\ 0 \le L'_m \le L_m \\ \frac{x_t}{y_t}(L'_1+L'_2+\ldots+L'_m) = \frac{x_1}{y_1}L'_1 + \frac{x_2}{y_2}L'_2 + \ldots + \frac{x_m}{y_m}L'_m \\ \frac{1-x_t-y_t}{y_t}(L'_1+L'_2+\ldots+L'_m) = \\ \frac{1-x_1-y_1}{y_1}L'_1 + \frac{1-x_2-y_2}{y_2}L'_2 + \ldots + \frac{1-x_m-y_m}{y_m}L'_m \end{cases}$$

where m is an integer equal to or greater than 2, $L_1$, $L_2, \ldots, L_m$ are respectively the maximum brightness values of the m primary colors of the colored light, and s.t. represents a constraint condition for the color light with m primary colors.

2. The color matching method for automatically implementing the maximum brightness of a colored light according to claim 1, wherein when the colored light has four primary colors, the color coordinate values of the target color mixture $K_t$ of the colored light are denoted as $(x_t, y_t)$, the brightness values of the four primary colors of the colored light are respectively denoted as $L'_r, L'_g, L'_b,$ and $L'_w$, and the color coordinate values of the four primary colors of the colored light are respectively denoted as $(x_r, y_r), (x_g, y_g), (x_b, y_b),$ and $(x_w, y_w)$;

the linear programming model is the following formula:

the target function is max $L_{sum}L'_r+L'_g+L'_b+L'_w$, $$s.t. \begin{cases} 0 \le L'_r \le L_r \\ 0 \le L'_g \le L_g \\ 0 \le L'_b \le L_b \\ 0 \le L'_w \le L_w \\ \frac{x_t}{y_t}(L'_r+L'_g+L'_b+L'_w) = \frac{x_r}{y_r}L'_r + \frac{x_g}{y_g}L'_g + \frac{x_b}{y_b}L'_b + \frac{x_w}{y_w}L'_w \\ \frac{1-x_t-y_t}{y_t}(L'_r+L'_g+L'_b+L'_w) = \frac{1-x_r-y_r}{y_r}L'_r + \frac{1-x_g-y_g}{y_g}L'_g + \\ \frac{1-x_b-y_b}{y_b}L'_b + \frac{1-x_w-y_w}{y_w}L'_w \end{cases}$$

where $L_r, L_g, L_b,$ and $L_w$ are respectively the maximum brightness values of the four primary colors of the colored light, s.t. represents a constraint condition; and when the colored light has three primary colors, the color coordinates values of the target color mixture $K_t$ of the colored light are denoted as $(x_t, y_t)$, the brightness values of the three primary colors of the colored light are respectively denoted as $L'_r, L'_g,$ and $L'_b$, and the color coordinate values of the three primary colors of the colored light are respectively denoted as $(x_r, y_r)$, $(x_g, y_g),$ and $(x_b, y_b)$;

the linear programming model is the following formula:

the target function is max $L_{sum}=L'_r+L'_g+L'_b$, $$s.t. \begin{cases} 0 \le L'_r \le L_r \\ 0 \le L'_g \le L_g \\ 0 \le L'_b \le L_b \\ \frac{x_t}{y_t}(L'_r+L'_g+L'_b) = \frac{x_r}{y_r}L'_r + \frac{x_g}{y_g}L'_g + \frac{x_b}{y_b}L'_b \\ \frac{1-x_t-y_t}{y_t}(L'_r+L'_g+L'_b) = \frac{1-x_r-y_r}{y_r}L'_r + \frac{1-x_g-y_g}{y_g}L'_g + \\ \frac{1-x_b-y_b}{y_b}L'_b \end{cases}$$

where $L_r, L_g,$ and $L_b$ are respectively the maximum brightness values of the three primary colors of the colored light, and s.t. represents a constraint condition.

3. A color regulation method for automatically implementing the maximum brightness of a colored light, comprising a formula calculation step and a color mixture control step, the formula calculation step comprises:

collecting brightness values and color coordinate values of each primary color of the colored light;

establishing a linear programming model according to a target color mixture $K_t$, and the brightness values and the color coordinate values of each primary color of the colored light; and taking a maximum value of a brightness sum value $L_{sum}$ of the primary colors of the colored light as a target function to solve the linear programming model to obtain brightness values for each primary color under the maximum value of the brightness sum value $L_{sum}$, the obtained brightness values for each primary color refer to as brightness formula values for each primary color, the brightness sum value $L_{sum}$ is a sum of the brightness values of each primary color, wherein when the colored light has m primary colors, the color coordinate values of the target color mixture $K_t$ of the colored light are denoted as $(x_t, y_t)$, the brightness values of the m primary colors of the colored light are respectively denoted as $L'_1, L'_2, \ldots, L'_m$, and the color coordinate values of the m primary colors of the colored light are respectively denoted as $(x_1, y_1), (x_2, y_2), \ldots,$ and $(x_m, y_m)$;

the linear programming model is the following formula:

the target function is max $L_{sum}=L'_1+L'_2+\ldots+L'_m$, $$s.t. \begin{cases} 0 \le L'_1 \le L_1 \\ 0 \le L'_2 \le L_2 \\ \ldots \ldots \\ 0 \le L'_m \le L_m \\ \frac{x_t}{y_t}(L'_1+L'_2+\ldots+L'_m) = \frac{x_1}{y_1}L'_1 + \frac{x_2}{y_2}L'_2 + \ldots + \frac{x_m}{y_m}L'_m \\ \frac{1-x_t-y_t}{y_t}(L'_1+L'_2+\ldots+L'_m) = \\ \frac{1-x_1-y_1}{y_1}L'_1 + \frac{1-x_2-y_2}{y_2}L'_2 + \ldots + \frac{1-x_m-y_m}{y_m}L'_m \end{cases}$$

where m is an integer equal to or greater than 2, $L_1$, $L_2, \ldots, L_m$ are respectively the maximum brightness values of the m primary colors of the colored light, and s.t. represents a constraint condition for the color light with m primary colors; and the color mixture control step comprises:

converting the brightness formula values for each primary color into a control signal, and controlling a color mixture of the colored light according to the control signal.

4. The color regulation method for automatically implementing the maximum brightness of a colored light according to claim 3, wherein the formula calculation step specifically comprises:

respectively calculating, according to specified n target color mixtures $K_t$ and the brightness values and the color coordinate values of each primary color of the colored light, n groups of brightness formula values for each primary color when the brightness sum value $L_{sum}$ of the primary colors of the colored light has maximum value in each case of the n target color mixtures $K_t$, where n is a natural number; and the color mixture control step comprises:

pre-storing the n groups of brightness formula values for each primary color, selecting one of the pre-stored groups of brightness formula values, converting the selected brightness formula values into a control signal, and controlling the color mixture of the colored light according to the control signal.

5. The color regulation method for automatically implementing the maximum brightness of a colored light according to claim 3, wherein when the colored light has four primary colors, the color coordinate values of the target color mixture $K_t$ of the colored light are denoted as $(x_t, y_t)$, the brightness values of the four primary colors of the colored light are respectively denoted as $L'_r$, $L'_g$, $L'_b$, and $L'_w$, and the color coordinate values of the four primary colors of the colored light are respectively denoted as $(x_r, y_r)$, $(x_g, y_g)$, $(x_b, Y_b)$, and $(x_w, y_w)$;

the linear programming model is the following formula:

the target function is max $L_{sum} = L'_r + L'_g + L'_b + L'_w$, $$\text{s.t.} \begin{cases} 0 \le L'_r \le L_r \\ 0 \le L'_g \le L_g \\ 0 \le L'_b \le L_b \\ 0 \le L'_w \le L_w \\ \frac{x_t}{y_t}(L'_r + L'_g + L'_b + L'_w) = \frac{x_r}{y_r}L'_r + \frac{x_g}{y_g}L'_g + \frac{x_b}{y_b}L'_b + \frac{x_w}{y_w}L'_w \\ \frac{1-x_t-y_t}{y_t}(L'_r + L'_g + L'_b + L'_w) = \frac{1-x_r-y_r}{y_r}L'_r + \frac{1-x_g-y_g}{y_g}L'_g + \\ \frac{1-x_b-y_b}{y_b}L'_b + \frac{1-x_w-y_w}{y_w}L'_w \end{cases}$$

where $L_r$, $L_g$, $L_b$, and $L_w$, are respectively the maximum brightness values of the four primary colors of the colored light, and s.t. represents a constraint condition for the colored light with four primary colors; and when the colored light has three primary colors, the color coordinates values of the target color mixture $K_t$ of the colored light are denoted as $(x_t, y_t)$, the brightness values of the three primary colors of the colored light are respectively denoted as $L'_r$, $L'_g$, and $L'_b$, and the color coordinates values of the three primary colors of the colored light are respectively denoted as $(x_r, y_r)$, $(x_g, y_g)$, and $(x_b, y_b)$;

the linear programming model is the following formula:

the target function is max $L_{sum} = L'_r + L'_g + L'_b$, $$\text{s.t.} \begin{cases} 0 \le L'_r \le L_r \\ 0 \le L'_g \le L_g \\ 0 \le L'_b \le L_b \\ \frac{x_t}{y_t}(L'_r + L'_g + L'_b) = \frac{x_r}{y_r}L'_r + \frac{x_g}{y_g}L'_g + \frac{x_b}{y_b}L'_b \\ \frac{1-x_t-y_t}{y_t}(L'_r + L'_g + L'_b) = \frac{1-x_r-y_r}{y_r}L'_r + \frac{1-x_g-y_g}{y_g}L'_g + \\ \frac{1-x_b-y_b}{y_b}L'_b \end{cases}$$

where $L_r$, $L_g$, and $L_b$ are respectively the maximum brightness values of the three primary colors of the colored light, and s.t. represents a constraint condition for the colored light with three primary colors.

6. The color regulation method for automatically implementing the maximum brightness of a colored light according to claim 3, wherein the color mixture control step of converting the brightness formula values for each primary color into a control signal of a control console of the colored light comprises:

dividing the brightness of the controlled colored light into N brightness levels from dark to bright, and converting the brightness formula values for each primary color into signal data of the control console of the colored light according to the following formula:

signal data =

$$\frac{\text{brightness formula values for various primary colors}}{\text{maximum brightness values of the various primary colors}} \times N,$$

and converting the signal data into a control signal based on brightness level M of the controlled colored light according to the following formula, where $0 \le M \le N$:

$$\text{control signal} = \text{signal data} \times \frac{M}{N}.$$

7. A color regulation system for automatically implementing the maximum brightness of a colored light, comprising:

a color matching calculation unit, which is configured to collect brightness values and color coordinate values of each primary color of the colored light;

establish a linear programming model according to a target color mixture $K_t$, and the brightness values and the color coordinate values of each primary color of the colored light; and take a maximum value of a brightness sum value $L_{sum}$ of the primary colors of the colored light as a target function to solve the linear programming model to obtain brightness values for each primary color under the maximum value of the brightness sum value $L_{sum}$, the obtained brightness values for each primary color refer to as brightness formula values for each primary color, the brightness sum value $L_{sum}$ is a sum of the brightness values of each primary color, wherein when the colored light has m primary colors, the color coordinate values of the target color mixture $K_t$ of the colored light are denoted as $(x_t, y_t)$, the brightness values of the m primary colors of the colored light are respectively denoted as $L'_1, L'_2, \ldots, L'_m$, and the color coordinate values of the m primary colors of the colored light are respectively denoted as $(x_1, y_1)$, $(x_2, y_2), \ldots$, and $(x_m, y_m)$;

the linear programming model is the following formula:

the target function is max $L_{sum} = L'_1 + L'_2 + \ldots + L'_m$, $$\text{s.t.} \begin{cases} 0 \le L'_1 \le L_1 \\ 0 \le L'_2 \le L_2 \\ \ldots \ldots \\ 0 \le L'_m \le L_m \\ \frac{x_t}{y_t}(L'_1 + L'_2 + \ldots + L'_m) = \frac{x_1}{y_1}L'_1 + \frac{x_2}{y_2}L'_2 + \ldots + \frac{x_m}{y_m}L'_m \\ \frac{1-x_t-y_t}{y_t}(L'_1 + L'_2 + \ldots + L'_m) = \\ \frac{1-x_1-y_1}{y_1}L'_1 + \frac{1-x_2-y_2}{y_2}L'_2 + \ldots + \frac{1-x_m-y_m}{y_m}L'_m \end{cases}$$

where m is an integer equal to or greater than 2, $L_r$, $L_g$, $L_b$, and $L_w$, are respectively the maximum brightness values of the m primary colors of the colored light, s.t. represents a constraint condition for the color light with m primary colors, a signal conversion unit, which is configured to convert the brightness formula values for each primary color into a control signal; and a drive unit, which is configured to control a color mixture of the colored light according to the control signal.

8. The color regulation system for automatically implementing the maximum brightness of a colored light according to claim 7, wherein the color matching calculation unit is configured to:

respectively calculate, according to specified n target color mixtures $K_t$ and the brightness values and the color coordinate values of each primary color of the colored light, n groups of brightness formula values for each primary color, when the brightness sum value $L_{sum}$ of the colored light has the maximum value in each case of the n target color mixtures $K_t$, where n is a natural number;

the system further comprises:

a color matching regulation channel, which is configured to input a color index value i, where i=1, 2, . . . , and n; and a control unit, which is configured to pre-store the n groups of brightness formula values for each primary color, acquire the color index value i, and select the pre-stored $i^{th}$ group of brightness formula values for the various primary colors; and the signal conversion unit is specifically configured to: convert the $i^{th}$ group of brightness formula values for each primary color into the control signal.

9. The color regulation system for automatically implementing the maximum brightness of a colored light according to claim 7, when the colored light has four primary colors, the color coordinates values of the target color mixture $K_t$ of the colored light are denoted as $(x_t, y_t)$, the brightness values of the four primary colors of the colored light are respectively denoted as $L'_r$, $L'_g$, $L'_b$, and $L'_w$, and the color coordinate values of the four primary colors of the colored light are respectively denoted as $(x_r, y_r)$, $(x_g, y_g)$, $(x_b, y_b)$, and $(x_w, y_w)$;

the linear programming model is the following formula:

the target function is max $L_{sum}=L'_r+L'_g+L'_b+L'_w$, $$s.t. \begin{cases} 0 \le L'_r \le L_r \\ 0 \le L'_g \le L_g \\ 0 \le L'_b \le L_b \\ 0 \le L'_w \le L_w \\ \frac{x_t}{y_t}(L'_r+L'_g+L'_b+L'_w) = \frac{x_r}{y_r}L'_r + \frac{x_g}{y_g}L'_g + \frac{x_b}{y_b}L'_b + \frac{x_w}{y_w}L'_w \\ \frac{1-x_t-y_t}{y_t}(L'_r+L'_g+L'_b+L'_w) = \frac{1-x_r-y_r}{y_r}L'_r + \frac{1-x_g-y_g}{y_g}L'_g + \\ \frac{1-x_b-y_b}{y_b}L'_b + \frac{1-x_w-y_w}{y_w}L'_w \end{cases}$$

where $L_r$, $L_g$, $L_b$, and $L_w$ are respectively the maximum brightness values of the four primary colors of the colored light, and s.t. represents a constraint condition for the colored light with four primary colors; and when the colored light has three primary colors, the color coordinates values of the target color mixture $K_t$ of the colored light are denoted as $(x_t, y_t)$, the brightness values of the three primary colors of the colored light are respectively denoted as $L'_r$, $L'_g$, and $L'_b$, and the color coordinates values of the three primary colors of the colored light are respectively denoted as $(x_r, y_r)$, $(x_g, y_g)$, and $(x_b, y_b)$;

the linear programming model is the following formula:

the target function is max $L_{sum}=L'_r+L'_g+L'_b$, $$s.t. \begin{cases} 0 \le L'_r \le L_r \\ 0 \le L'_g \le L_g \\ 0 \le L'_b \le L_b \\ \frac{x_t}{y_t}(L'_r+L'_g+L'_b) = \frac{x_r}{y_r}L'_r + \frac{x_g}{y_g}L'_g + \frac{x_b}{y_b}L'_b \\ \frac{1-x_t-y_t}{y_t}(L'_r+L'_g+L'_b) = \frac{1-x_r-y_r}{y_r}L'_r + \frac{1-x_g-y_g}{y_g}L'_g + \\ \frac{1-x_b-y_b}{y_b}L'_b \end{cases}$$

where $L_r$, $L_g$, and $L_b$ are respectively the maximum brightness values of the three primary colors of the colored light, and s.t. represents a constraint condition for the colored light with three primary colors.

10. The color regulation system for automatically implementing the maximum brightness of a colored light according to claim 7, further comprising:

a brightness regulation channel, which is configured to input a brightness level M of the controlled colored light, wherein the signal conversion unit is configured to:

divide brightness of the controlled colored light into N levels from dark to bright, and convert the brightness formula values for each primary color into signal data of a control console of the colored light according to the following formula:

$$\text{signal data} = \frac{\text{brightness formula values for various primary colors}}{\text{maximum brightness values of the various primary colors}} \times N,$$

and convert the signal data into a control signal based on the brightness level M of the controlled colored light according to the following formula, where 0≤M≤N:

$$\text{control signal} = \text{signal data} \times \frac{M}{N}.$$

* * * * *